Figure 1:
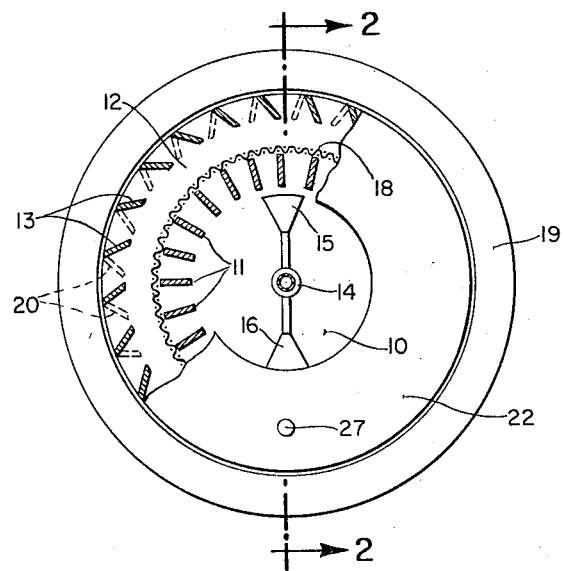

Nov. 29, 1966     H. R. WARREN ETAL     3,287,904

GAS TURBINE ENGINE

Filed Oct. 14, 1965

United States Patent Office 3,287,904
Patented Nov. 29, 1966

3,287,904
GAS TURBINE ENGINE
Henry Russell Warren, 5069 Greenbrier Drive, and Russell Phillips Warren, 2712 McGregor Blvd., both of Fort Myers, Fla.
Filed Oct. 14, 1965, Ser. No. 496,083
9 Claims. (Cl. 60—39.34)

This application is a continuation-in-part of our parent application Serial No. 274,136 filed April 19, 1963, now Patent No. 3,224,711.

This invention relates to gas turbine engines, and more specifically to the gas turbine engines of the type having structure therein for providing sequential cooling and fueling of the combustion chambers.

One of the major problems which must be faced in the design and construction of internal combustion engines and especially gas turbine engines is the maximum temperature rise permissible within the combustion chamber and the means or provision made for cooling the combustion chamber and turbine blades in order that the temperature rises therein will not exceed those permissible.

One of the principal methods used today for cooling the combustion chambers and turbine blades of gas turbine engines is to tap or bleed off a suitable portion of the air flow from the compressor stages thereof and pass this air around the outside of the combustion chambers which by necessity will be formed of two concentric shells.

Another cooling method presently in use is to effuse the cooling air through a permeable turbine blade wall thus establishing a laminar flow of air along the blade which results in a reduction in the heat transfer coefficient. Still another way which has been used in the past for cooling the turbine blades of gas turbine engines is to cool the blades with air or liquid passing through internal passages within the blades or in the alternative, to have a static quantity of liquid in the blades such as sodium which, through its high coefficient of heat transfer, will conduct the heat from the blades to other parts of the engine where it can be readily dispelled.

All of the foregoing methods of cooling gas turbine engines are both expensive and complicated in their construction. Further, in engines utilizing these cooling methods, the continuous combustion within the combustion chambers will, in spite of the cooling method used, prevent the generation of the maximum temperatures and pressures desirable for maximum efficiency.

Accordingly, it is an object of the present invention to provide a gas turbine engine having means therein for cooling the combustion chambers, turbine blades, and stator blades by continuously passing air from the compressor stage of the gas turbine engine through the combustion zones while sequentially distributing fuel therein. This cyclic combustion in the combustion chamber will permit temperatures and pressures therein during the fueling cycle beyond that ordinarily permissible while the overall average temperature thereof is limited to values within tolerable limits.

More specifically, in the present invention there is provided a main driving member having a plurality of air compressing and turbine driving elements disposed in a circular array on and in driving relationship with the driving member, together with an enclosing member extending over and around these elements in such a manner as to form with the driving member an air compressing region, a turbine driving zone, and a combustion zone further in combination with a fuel distribution system for distributing fuel to the combustion zone in alternate fueling and cooling cycles to permit maximum temperatures and pressures within the combustion zone and turbine driving zone during the fueling cycle thereof while limiting the average temperatures and pressures therein below those developed in the combustion zone and turbine driving zone during fuel distribution thereto.

Figure 2:
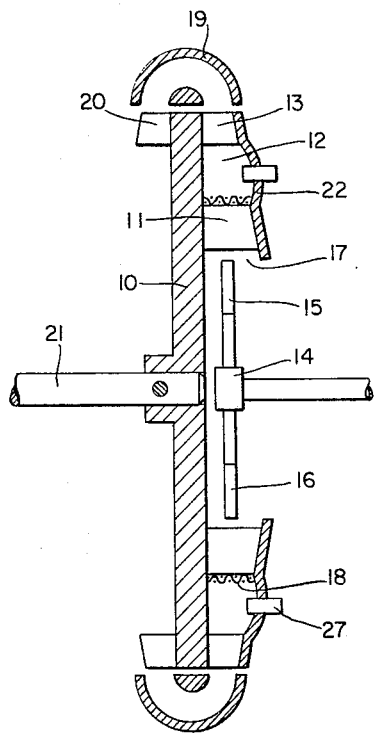
Figure 3:
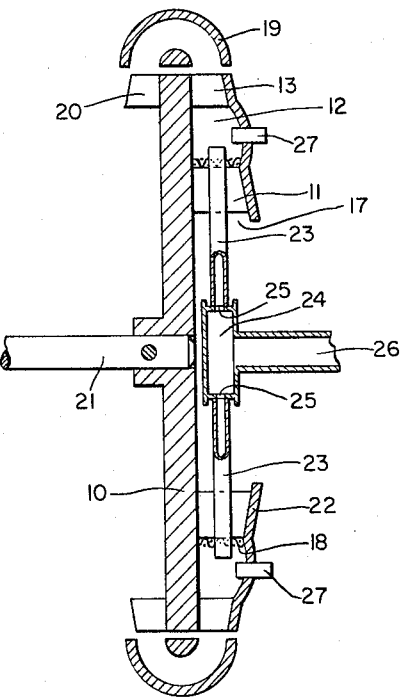

Other objects and advantages of the present invention will become apparent from the description thereof taken in view of the drawings in which:

FIG. 1 is a plan view of the gas turbine engine of the present invention;
FIG. 2 is a cut-away view of FIG. 1; and
FIG. 3 is an alternative embodiment of the fuel distributing means used in the embodiment of FIG. 1 and FIG. 2.

Referring now to FIG. 1 and FIG. 2, one embodiment of the present invention has been illustrated and includes an output shaft 21 having connected thereto a driving member 10 which includes in a circular array thereon a plurality of air compressing elements 11, which as can be seen from FIG. 1, further defines an annular air entrance 17.

Disposed on the outer circumference of the driving member 10 and in a circular array thereon is a plurality of turbine driving elements 13 which in combination with a circular air deflector 22 form a continuous annular combustion chamber 12. The air deflector 22 may be fixed if desired, though preferably it will be secured to the air compressing blades 11 and turbine driving blades 13 and thus provide additional structural support for the multiplicity of the blades.

At least two fuel distributing heads 15 and 16 are disposed within the annular air entrance 17 and secured to a fuel header 14 which is suitably journaled within the annular air entrance. While only two fuel distributing heads have been illustrated, the number thereof is a matter of choice depending upon the particular application for which the engine is being used. Further, the fuel distributing heads may be fixed against rotation or the symmetrically disposed fuel heads 15, 16 and fuel header 14 may be suitably journaled for rotation either in the same direction as the driving member 10 or in an opposite direction thereto further depending upon the particular application for which the engine is to be used. This feature of the invention will be discussed in more detail later.

The combustion chamber 12 further includes a backfire screen 18 therein and a plurality of fuel ignitors 27 which serve to ignite the fuel in the combustion chamber in accordance with the cycle of fuel distribution as will also be discussed in more detail later.

In operation of the engine, it will be appreciated that upon an initial rotation of the ouput shaft 21, the air compressing blades 11 will induct large quantities of air through the annular air entrance 17 and slightly compress the air in the combustion zone 12, the beginning of which is marked by the location of the backfire screen 18. Fuel will now be distributed from the plurality of fuel distributing heads and this fuel mixing with the air being inducted through the annular air entrance 17 will pass into the combustion chamber 12 whereupon it will be ignited by the fuel ignitors 27. The increased gas energy resulting from the combustion of the fuel will be directed against the turbine driving elements 13 and thereby impart a rotational force to the driving member and output shaft 21 whereupon the engine will gain in momentum until the final desired operating conditions are reached.

Considering at first that the fuel distributing heads 16, 17 and the fuel header 14 are fixed against rotation, it will be appreciated that the fuel distribution and consequent combustion will produce flame fronts in the annular combustion chamber 12 which will equal the number of fuel distributing heads and will be moving within and circumferentially around the combustion chamber 12. Once combustion has been initiated within the combustion chamber, the flame fronts therein will be self-sustaining and will follow the fuel distributing heads. However, to aid in starting and to further insure continuous combustion within the combustion chamber, a plurality of fuel ignitors 27 are provided which are actuated circumferentially and alternately around the annular combustion chamber 12 in accordance with the relative rotation of the driving member 10 with respect to the fuel distributing heads.

While the combustion or flame fronts are moving circumferentially around the annular combustion chamber in accordance with the number of fuel distributing heads employed and the relative rotation between the fuel distributing heads and the driving member 10, there will be, nevertheless, a continuous induction of air through the annular air entrance 17, which air will be continuously passed through the combustion chamber and against the turbine driving elements 13. The air thus inducted will serve a two-fold purpose, the first being to cool the combustion zone and turbine driving elements in that portion of the combustion chamber at that time not receiving fuel and the second to impart further rotational force to the driving member 10 as a result of this volume of air being directed against the turbine driving elements 13.

If additional energy yield is desired from the gas turbine engine, a stationary and circumferential stator 19 may be utilized to redirect the gas efflux from the turbine driving elements 13 through 180° and redirect this efflux against a second plurality of turbine driving blades 20 which are oppositely inclined to the turbine driving elements 13.

In the embodiment wherein the stator 19 is employed, it is preferable that the fuel distributing heads 15, 16 and the fuel header 14 rotate relative to the stator 19. With relative rotation between the fuel distributing heads and the stator, the fuel will be distributed sequentially relative to the stator as well as sequentially relative to the driving member 10. This will allow sequential cooling of the stator 19 as well as the combustion chamber and turbine driving elements as discussed above.

While only two stages of turbine driving elements and one driving member have been illustrated, it is to be understood that more than two turbine driving stages may be utilized as desired as well as more than one driving member.

In the embodiment above discussed, the fuel is distributed directly into the annular air entrance 17 and mixed with the air passing therethrough. However, it may be preferred that the fuel be distributed directly into the combustion chamber 12 in accordance with the embodiment disclosed in FIG. 3.

This alternative fuel distribution may be accomplished by means of a plurality of fuel distributing passages 23 which extend into the combustion chamber 12. The fuel distributing passages 23 terminate in a fuel distributing head 24 secured to a fuel distribution shaft 26.

As in the embodiment of FIGS. 1 and 2, if the stator 19 is not employed, then the fuel distributing head 24 and fuel distributing shaft 26 may remain fixed whereby the fuel will be sequentially directed to the combustion chamber 12 through the fuel distributing passages 23 by means of two orifices 25 as the fuel distributing passages 23 revolve around the fuel distributing head 24. The number of orifices 25 utilized will depend upon the number of independent flame fronts desired within the combustion chamber at one time.

However, if a stator 19 is employed, then it is preferable that the fuel distributing head 24 and associated fuel distributing shaft 26 rotate relative to the stator 19 to provide sequential cooling of the stator 19 as discussed above.

The fuel disribution system of FIG. 3 has an added advantage in that the fuel pressure to the fuel distributing head 24 need be only of a low order since the centrifugal force developed by the rotating fuel pipes 23 may be utilized for the development of the high pressure required for proper spraying or distribution of the fuel in the combustion chamber 12.

While preferred embodiments of the invention have been illustrated and described, it is to be understood that modifications may be made thereto without departing from the scope and spirit of the appended claims.

What is claimed is:
1. A gas turbine engine comprising:
a main driving member;
a plurality of air compressing and turbine-driving blades disposed in a circular array around and forming a driving connection with said driving member;
an enclosing member extending over and around said turbine driving elements and said air compressing elements and forming for rotation with said driving member an air compressing region, a continuous combustion zone, and a turbine-driving zone; and
fuel distribution means for distributing fuel to said combustion zone in alternate fueling and cooling cycles to permit maximum temperatures and pressures within the average temperature rise of said combustion zone and said turbine-driving zone during the fueling cycle thereof while limiting the average temperatures and pressures therein below those developed in said combustion zone and said turbine-driving zone during fuel distribution thereto.

2. A gas turbine engine comprising:
a circular driving member;
a plurality of air compressing elements disposed in a circular array on and in driving connection with said driving member;
a plurality of turbine-driving elements disposed in a circular array on and in driving relationship with said driving member;
means enclosing said plurality of air compressing elements and said plurality of turbine-driving elements defining a rotating annular combustion chamber therebetween; and
fuel distribution means for sequentially distributing fuel circumferentially within said annular combustion chamber to permit maximum temperatures and pressures within the portions of said rotating annular combustion chamber at that time receiving fuel while limiting the overall average temperatures and pressures therein below said maximum temperatures and pressures.

3. A gas turbine engine comprising:
a circular driving member;
a plurality of air compressing elements secured in a circular array to said circular driving member defining an annular air entrance thereon;
a plurality of turbine-driving elements secured to said driving member in a circular array thereon at a radius greater than said circular array of air compressing elements;
a circular air deflecting member disposed over and secured to said plurality of air compressing elements and said plurality of turbine-driving elements forming a continuous rotating annular combustion chamber therebetween; and
fuel distribution means for distributing fuel continuously and sequentially along said continuous rotating annular combustion chamber to permit maximum temperatures and pressures to be developed within the portions thereof at that time receiving fuel while limiting the overall average temperatures and pressures therein below said maximum temperatures and pressures.

4. The gas turbine engine of claim 3 further including:
a plurality of second stage turbine-driving elements secured to said circular driving member; and
a stator disposed adjacent said plurality of turbine-driving elements for redirecting the efflux of exhaust gasses therefrom against said plurality of second stage turbine-driving elements.

5. The gas turbine engine of claim 4 wherein said fuel distribution means sequentially distributes fuel relative to said stator as well as relative to said combustion chamber.

6. The gas turbine engine of claim 3 wherein said fuel distribution means includes fuel distributing heads disposed within said annular air entrance for mixing fuel with air inducted through the annular air entrance prior to delivery to the combustion chamber.

7. The gas turbine engine of claim 3 wherein said fuel distributing means distributes fuel directly into said annular combustion chamber.

8. The gas turbine engine of claim 3 wherein said fuel distribution means include a plurality of fuel distributing passages rotatable with said driving member and extending into said continuous rotating annular combustion chamber for direct delivery of fuel thereto, and a fuel distributing head for sequentially distributing fuel to said plurality of fuel distributing passages at a radius nearer the axis of said driving member than said annular combustion chamber for developing a pressure on fuel in said plurality of fuel distributing passages by centrifugal force applied thereto.

9. The gas turbine engine of claim 3 wherein said fuel distribution means is rotatably disposed within said gas turbine engine in order that the rate of sequential fuel delivery to said continuous rotating annular combustion chamber may be varied independently of the rate of rotation thereof.

References Cited by the Examiner
UNITED STATES PATENTS 2,547,959  4/1951  Miller _____ 60—39.74
3,067,967  12/1962  Barr _____ 60—35.6

MARK NEWMAN, *Primary Examiner.*

RALPH D. BLAKESLEE, *Examiner.*